US008755093B2

United States Patent
Shimizu

(10) Patent No.: US 8,755,093 B2
(45) Date of Patent: Jun. 17, 2014

(54) IMAGE READING APPARATUS AND COMPUTER READABLE MEDIUM

(75) Inventor: Kosuke Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/344,122

(22) Filed: Jan. 5, 2012

(65) Prior Publication Data

US 2013/0027758 A1 Jan. 31, 2013

(30) Foreign Application Priority Data

Jul. 27, 2011 (JP) .................................. 2011-164332

(51) Int. Cl.
H04N 1/04 (2006.01)
(52) U.S. Cl.
USPC ............ 358/475; 358/482; 358/483; 358/461
(58) Field of Classification Search
USPC ......... 358/461, 475, 482, 483, 509, 512, 514, 358/487, 506
See application file for complete search history.

(56) References Cited

U.S. PATENT DOCUMENTS

| 4,654,723 | A | * | 3/1987 | Nagano | 358/483 |
| 4,658,303 | A | * | 4/1987 | Nagano | 358/483 |
| 5,847,845 | A | * | 12/1998 | Takahashi et al. | 358/475 |
| 7,308,375 | B2 | * | 12/2007 | Jensen et al. | 702/107 |
| 7,375,864 | B2 | * | 5/2008 | Kanno | 358/483 |
| 8,040,577 | B2 | * | 10/2011 | Akiyama | 358/486 |
| 2003/0142371 | A1 | * | 7/2003 | Hanabusa et al. | 358/475 |
| 2007/0086067 | A1 | * | 4/2007 | Suemoto et al. | 358/482 |
| 2009/0219584 | A1 | * | 9/2009 | Ingendoh | 358/475 |
| 2011/0188095 | A1 | * | 8/2011 | Shiraishi | 358/474 |
| 2011/0255118 | A1 | * | 10/2011 | Okada et al. | 358/1.13 |
| 2012/0127543 | A1 | * | 5/2012 | Okada et al. | 358/475 |

FOREIGN PATENT DOCUMENTS

| JP | 10285338 A | * | 10/1998 | .............. H04N 1/04 |
| JP | 2005-051566 A | | 2/2005 | |
| WO | WO 2010079725 A1 | * | 7/2010 | |

* cited by examiner

*Primary Examiner* — Allen H Nguyen
(74) *Attorney, Agent, or Firm* — Sughrue Mion, PLLC

(57) ABSTRACT

An image reading apparatus includes a light source, a reading unit, a moving unit, a moving speed control unit, a turn-ON time control unit. The light source irradiates light onto a document. The reading unit receives light reflected from the document, converts the received light into electrical charges, and accumulates the electrical charges as an image signal. The moving unit relatively moves the light source and the document. The moving speed control unit controls a moving speed of the moving unit in accordance with a reading mode of the image reading apparatus to control a reading speed in the reading unit. The turn-ON time control unit controls the light source to be turned off in a given period based on the reading mode when the reading unit accumulates the electric charges so as to prevent the electrical charges accumulated in the reading unit from reaching a saturation amount.

9 Claims, 13 Drawing Sheets

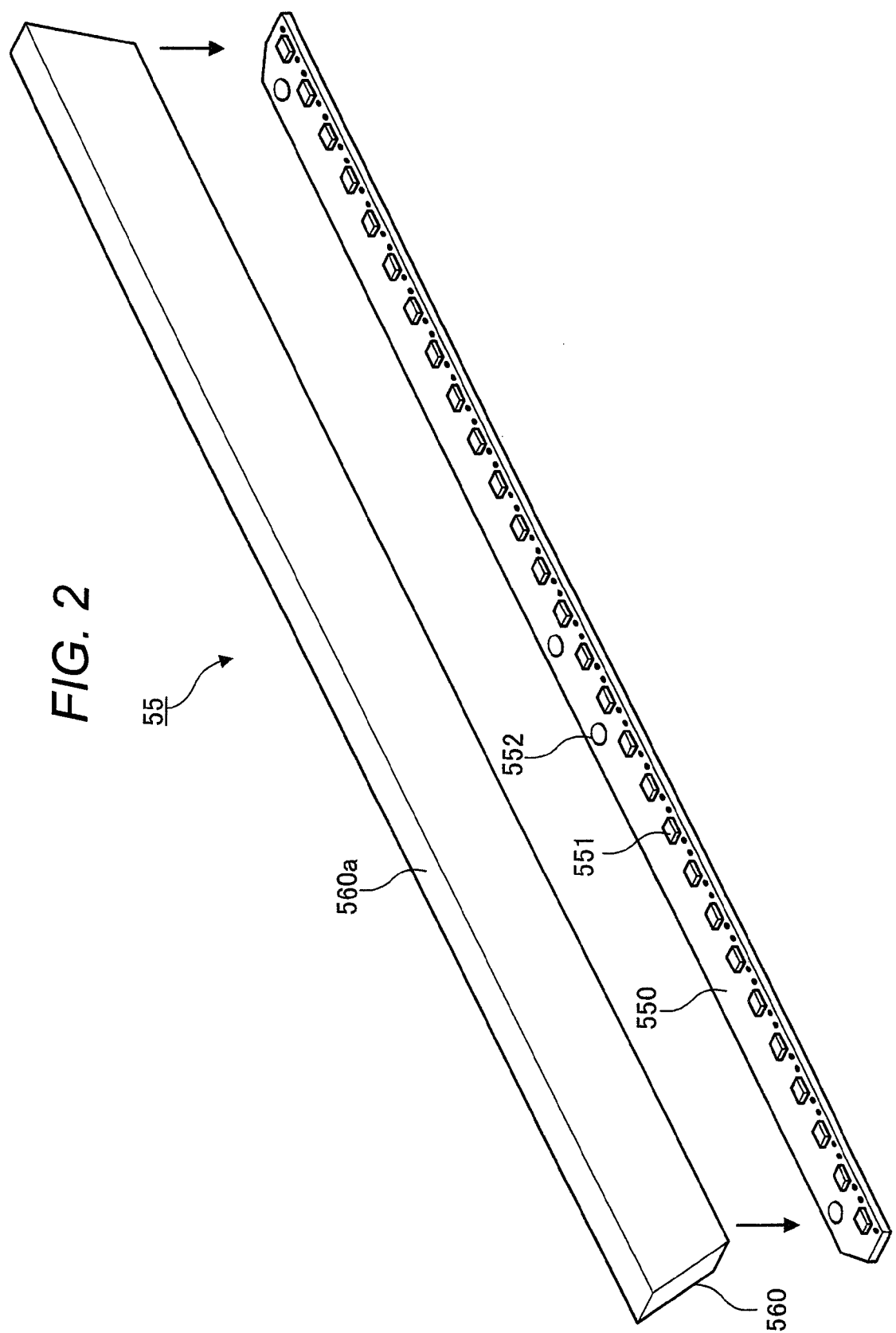

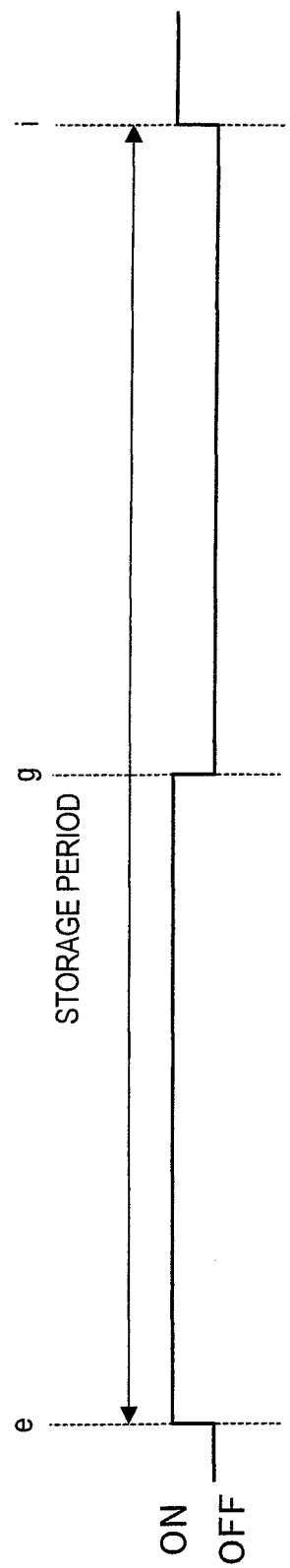

IMAGE READING APPARATUS AND COMPUTER READABLE MEDIUM

CROSS-REFERENCE TO RELATED APPLICATIONS

This application is based upon and claims priority under 35 USC 119 from Japanese Patent Application No. 2011-164332, filed Jul. 27, 2011.

BACKGROUND

1. Technical Field

The present invention relates to an image reading apparatus and a computer readable medium.

2. Related Art

Conventionally, as a copy machine, a facsimile, or a scanner for computer input, an image reading apparatus that automatically reads out image information of a document have been used. In the image reading apparatus of the related art, a light source that extends in a direction perpendicular to a conveying path of the document is used to irradiate light onto the document, and reflected light from the irradiated document is received by an imaging sensor to read out an image on the document.

SUMMARY OF THE INVENTION

According to an aspect of the invention, an image reading apparatus includes a light source, a reading unit, a moving unit, a moving speed control unit, a turn-ON time control unit. The light source irradiates light onto a document. The reading unit receives light reflected from the document, converts the received light into electrical charges, and accumulates the electrical charges as an image signal. The moving unit relatively moves the light source and the document. The moving speed control unit controls a moving speed of the moving unit in accordance with a reading mode of the image reading apparatus to control a reading speed in the reading unit. The turn-ON time control unit controls the light source to be turned off in a given period based on the reading mode when the reading unit accumulates the electric charges so as to prevent the electrical charges accumulated in the reading unit from reaching a saturation amount.

BRIEF DESCRIPTION OF THE DRAWINGS

Exemplary embodiments of the invention will be described in detail based on the following figures, wherein:

FIG. 2 illustrates an exemplary configuration of a light source according to the embodiment;

FIG. 5-1 is a flow chart illustrating an exemplary operation of an image processing circuit;

FIG. 5-2 is a flow chart illustrating an exemplary operation of an image processing circuit;

FIGS. 9A to 9C are timing charts of a light source turn-ON signal when a reading mode is changed.

DETAILED DESCRIPTION

<Description of an Entire Image Reading Apparatus>

Hereinafter, embodiments of the present invention will be described in detail with reference to the accompanying drawings.

Figure 1:
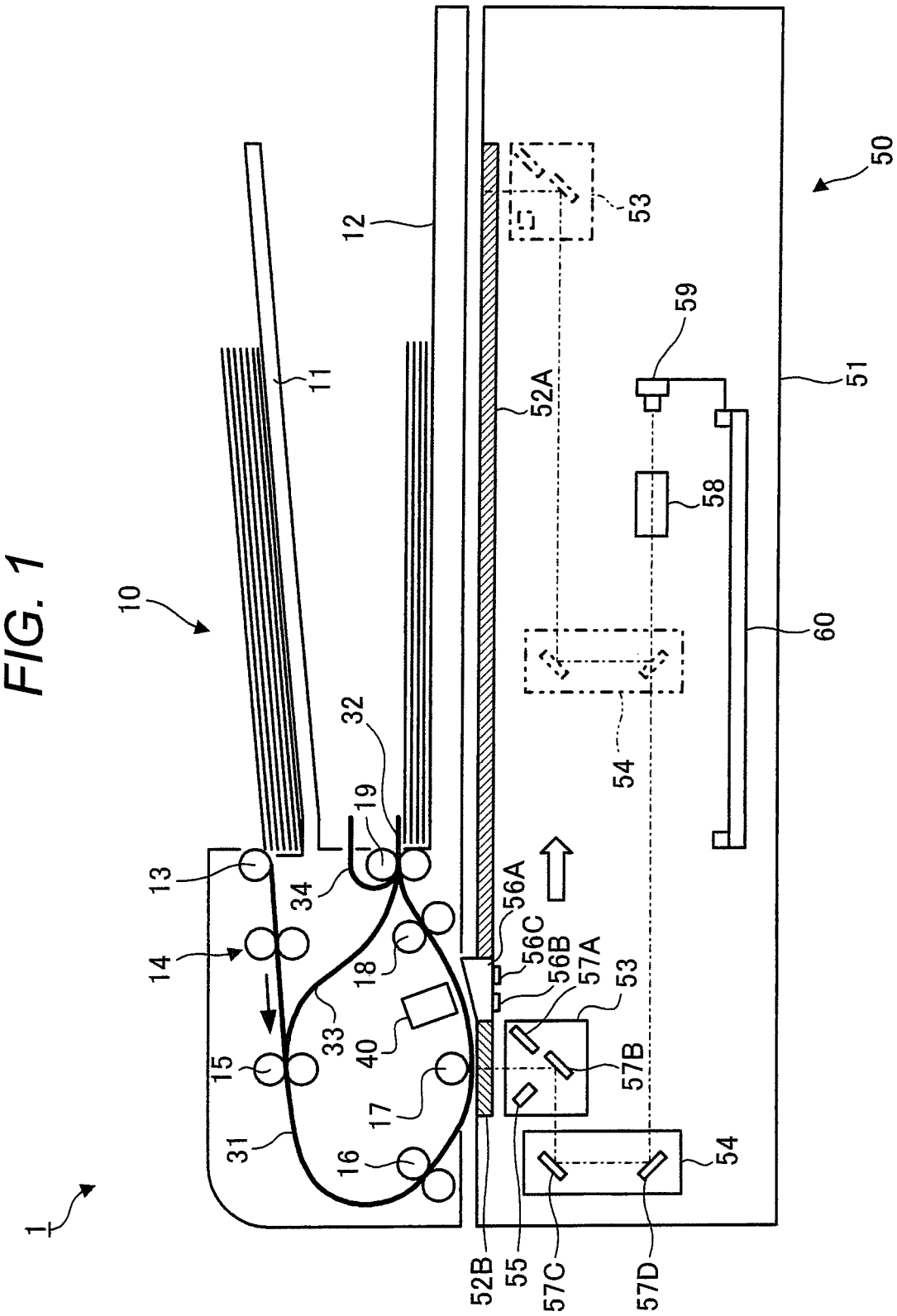
FIG. 1 illustrates an exemplary configuration of an image reading apparatus according to an embodiment of the present invention.

FIG. 1 illustrates an exemplary configuration of an image reading apparatus 1 according to an embodiment of the present invention. The image reading apparatus 1 shown in FIG. 1 can read out not only an image of a fixed document, but also an image of a document which is being conveyed. Therefore, the image reading apparatus 1 includes a document feeding device 10 that sequentially conveys a document from the loaded bundle of documents and a reading device 50 that scans the document to read an image.

The document feeding device 10 includes a document loading unit 11 that loads a bundle of documents formed with a plurality of documents and a discharged document loading unit 12 that is located below the document loading unit 11 and loads documents that have been read-out. The document feeding device 10 includes a paper conveying roller 13 that takes out and conveys a document of the document loading module 11. A processing mechanism 14 that processes paper one by one using a feed roller and a retard roller is provided in the downstream of the document conveying direction of the paper conveying roller 13. In a first conveying path 31 where a document is conveyed, a pre-register roller 15, a register roller 16, a platen roller 17, and an outer roller 18 are provided in this order from the upstream of the document conveying direction. Inside the document feeding device 10, a CIS (contact image sensor) unit 40 is provided.

The pre-register roller 15 conveys the document that is processed one by one toward the downstream rollers and forms a loop of the documents. The register roller 16 temporarily stops the rotation and then restarts the rotation at an appropriate timing and feeds the documents while adjusting the registration (shift) with respect to the reading device 50 which will be described below. The platen roller 17 assists to convey a document that is being read in by the reading device 50. The outer roller 18 conveys the document that is read in by the reading device 50 to the further downstream. A second conveying path 32 that guides the document to the discharged document loading unit 12 is provided further downstream of the document conveying direction than the outer roller 18. An ejecting roller 19 is provided in the second conveying path 32 in the second conveying path 32.

In the image reading apparatus 1, a third conveying path 33 is provided between an outlet of the outer roller 18 and an inlet of the pre-register roller 15 so that the images formed on both sides of the document can be read in one process. The above-mentioned ejecting roller 19 also has a function that makes the document upside down and conveys the document to the third conveying path 33.

In the image reading apparatus 1, when both sides of the document are read out, a fourth conveying path 34 is provided so as to eject the document to be upside down once again at the time of being ejected to the discharged document loading unit 12. The fourth conveying path 34 is provided above the second conveying path 32. The above-mentioned ejecting roller 19 also has a function that makes the document upside down and conveys the document to the fourth conveying path 34.

In the meantime, the reading device 50 supports the document feeding device 10 so as to be able to close and open, allows the document feeding device 10 to be supported by a device frame 51, and reads an image of the document conveyed by the document feeding device 10. The reading device 50 includes the device frame 51 that forms a chassis, a first platen glass 52A that loads a document whose image will be read in a stop status, and a second platen glass 52B having an opening for light to read out the document conveyed by the document feeding device 10. Here, the second platen glass 52B may be configured by an elongated transparent glass plate.

The reading device 50 includes a full-rate carriage 53 that stops below the second platen glass 52B or scans across the first platen glass 52A to read in the image and a half rate carriage 54 that supplies the light obtained by the full rate carriage 53 to an imaging unit. The full rate carriage 53 is provided with a light source 55 that is turned on to irradiate light onto the document, a first mirror 57A that reflects the light from the light source 55 to irradiate the light onto the document, and a second mirror 57B that reflects the reflected light obtained from the document. The half rate carriage 54 includes a third mirror 57C and a fourth mirror 57D that provide the light obtained from the second mirror 57B to the imaging unit. The reading device 50 includes a driving source (not shown) such as a motor that moves the half rate carriage 54 and the full rate carriage 53 having the light source 55 in a sub-scanning direction. The driving source serves as an example of a moving means that relatively moves the light source 55 and the document.

The reading device 50 includes an imaging lens 58 and a CCD (charge coupled device) image sensor 59 that is an example of a reading unit that receives the reflected light from the document and then photoelectrically converts the received light to accumulate electrical charges as an image signal so as to read the image of the document. The imaging lens 58 optically reduces an optical image obtained from the fourth mirror 57D. The CCD image sensor 59 photoelectrically converts an optical image formed by the imaging lens 58. That is, the reading device 50 forms an image on the CCD image sensor 59 using a so-called reduction optical system. The CCD image sensor 59 is configured, for example, by three line color CCD sensor. The CCD image sensor 59 photoelectrically converts the reflected light from the document in the pixel unit to output R (red), G (green), and B (blue) analog image signals (hereinafter, referred to as "RGB signals") as an image signal. The reading device 50 includes a guide 56A that guides the document to be conveyed in the document feeding device 10 between the first platen glass 52A and the second platen glass 52B. Below the guide 56A, a white reference plate 56B that extends along a main scanning direction and a chromatic reference plate 56C that is an example of a chromatic reference member are installed.

The reading device 50 further includes a control/image processing unit 60 as an example of a control unit. The control/image processing unit 60 performs predetermined processing on image data of the document input from an image sensor (not shown) provided in the contact image sensor unit 40 and the CCD image sensor 59. The control/image processing unit 60 controls individual operations of the components in the reading operation of the image reading apparatus 1.

Next, descriptions will be made for a case where the image reading apparatus 1 reads out the document. For example, when an image of the document disposed on the first platen glass 52A is read out, the full rate carriage 53 and the half rate carriage 54 move in a scanning direction (a direction indicated by an arrow) at a ratio of 2:1. In this case, light is irradiated onto a side of the document to be read from the light source 55 of the full rate carriage 53 via the first mirror 57A. Next, the reflected light from the document is reflected onto the second mirror 57B.

Thereafter, the reflected light is reflected by the third mirror 57C and the fourth mirror 57D in this order to be guided to the imaging lens 58. The light guided to the imaging lens 58 is imaged onto a light receiving surface of the CCD image sensor 59. The CCD image sensor 59 is a one dimensional sensor, and performs a simultaneous processing for one line of the image sensor, which will be described in detail below. If it is completed to read out one line in the line direction (main scanning direction), the full rate carriage 53 moves in a direction perpendicular to the main scanning direction (sub-scanning direction), and thus the next line of the document is read out. Such a processing is performed for entire size of the document, and then the one page of document is completely read out.

In the meantime, when the image of the document to be conveyed by the document feeding device 10 is read, the document to be conveyed by the document feeding device 10 passes on the second platen glass 52B. At this time, the full rate carriage 53 and the half rate carriage 54 stop in a position indicated by the solid line in FIG. 1. The reflected light from the one line of the document that has passed the platen roller 17 of the document feeding device 10 is guided to the imaging lens 58 via the second mirror 57B, the third mirror 57C, and the fourth mirror 57D. In this case, the document feeding device 10 functions as an example of a moving means that relatively moves the light source 55 and the document.

The reflected light forms an image by the imaging lens 58 and the image is read by the CCD image sensor 59. After simultaneously performing processings for one line in the main scanning direction by the CCD image sensor 59 which is a one-dimensional sensor, the next one line in the main scanning direction of the document to be conveyed by the document feeding device 10 is read in. Thereafter, the rear end of the document passes through the reading out position of the second platen glass 52B so that one page is completely read out in the sub-scanning direction. Here, according to the present embodiment, when the first side of the document is read out by the CCD image sensor 59, the second side of the document can be read out by the contact image sensor unit 40 at the same time.

<Description of Light Source>

Figures 1, 5:
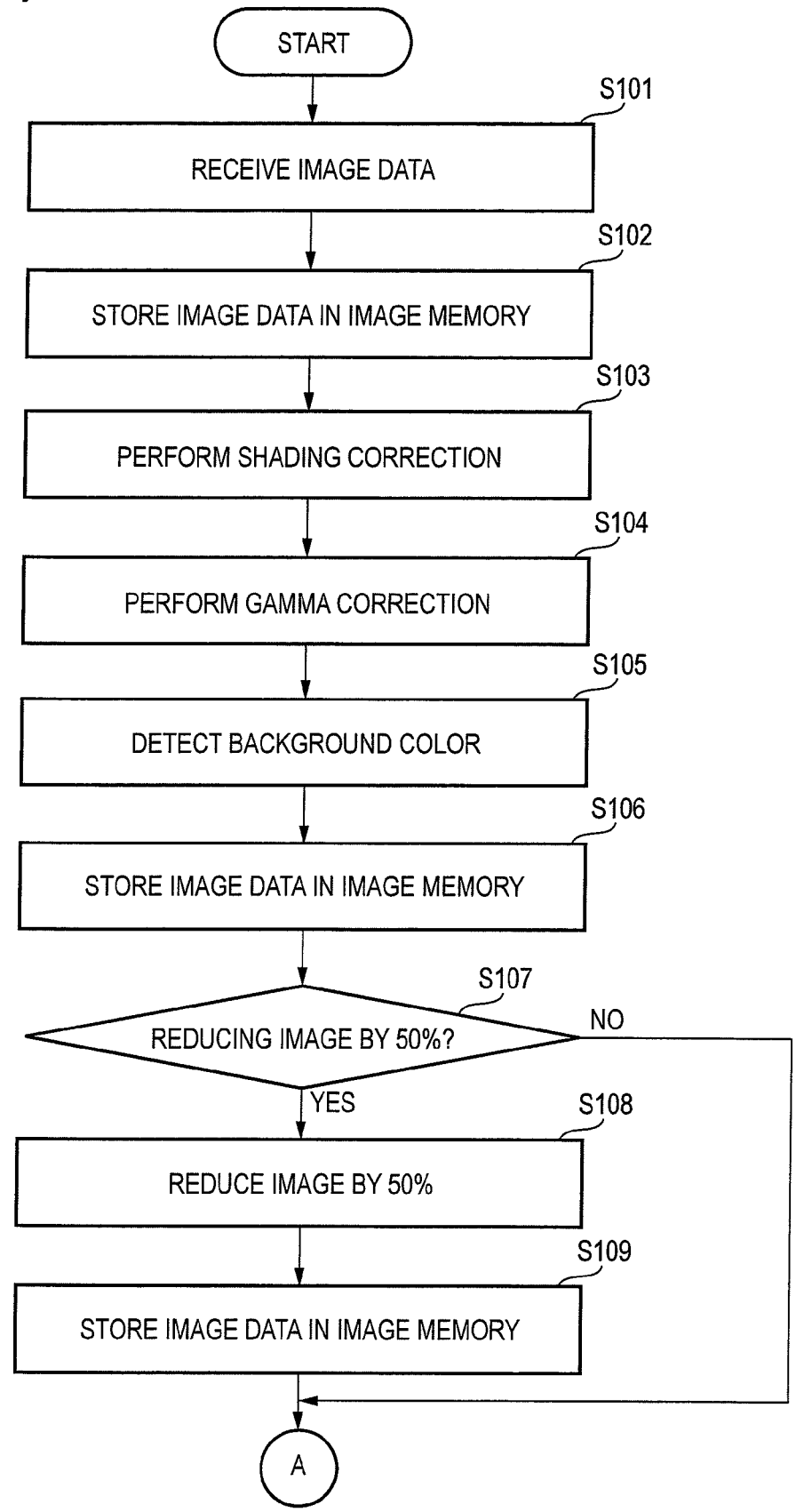
Figures 2, 5:
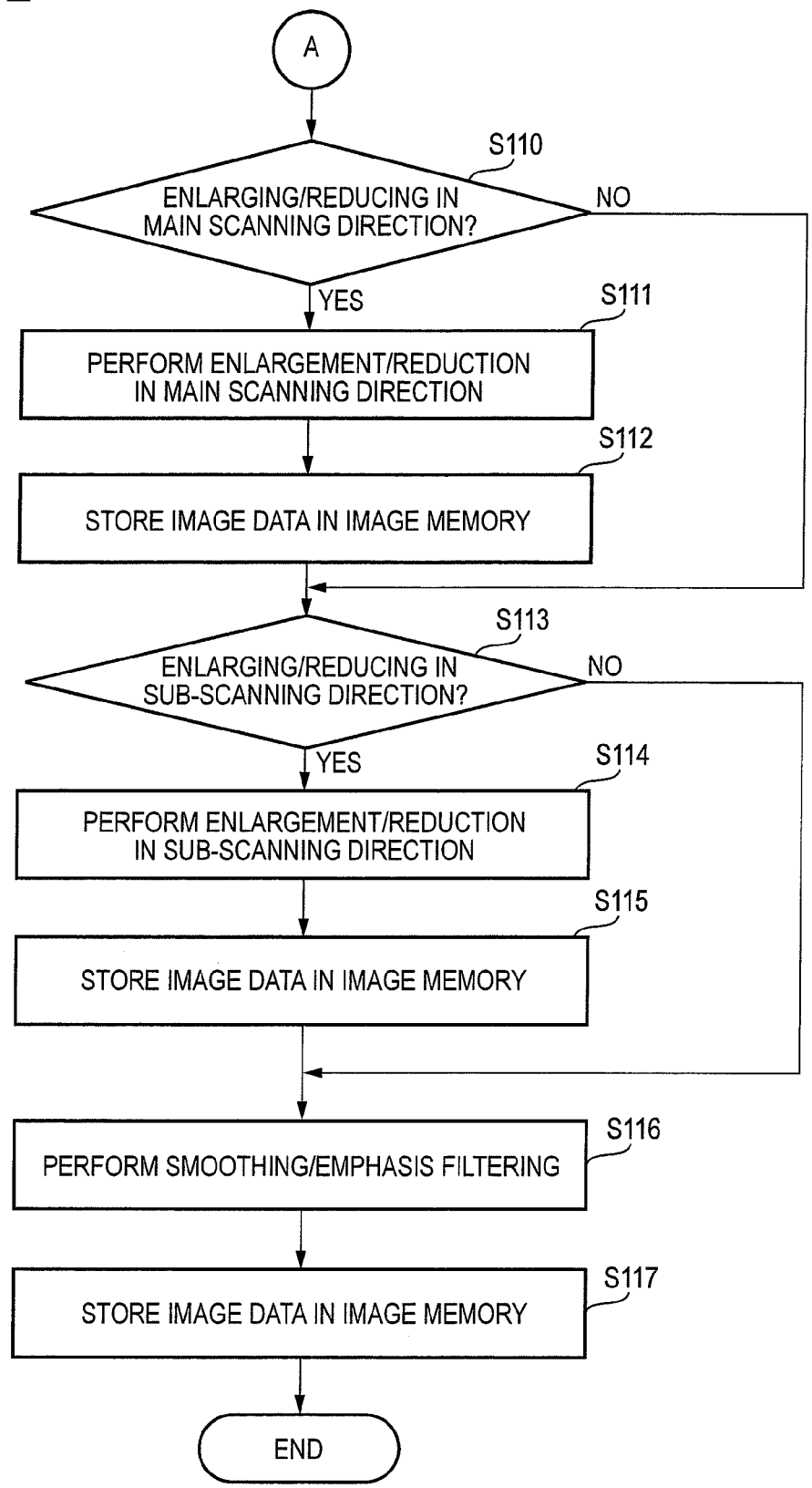

FIG. 2 is a view showing a configuration example of a light source 55 according to the embodiment.

The light source 55 shown in FIG. 2 includes light emitting diode (LED) chips 551 that are arranged in a line on a multilayer substrate 550, fixing holes 552 that are formed on the multilayer substrate 550 to fix the light sources 55, and a light guiding plate 560 that is disposed in a light emitting direction of the LED chips 551 to guide the light from the LED chips 551 and radiate the light with a predetermined light distribution pattern.

The multilayer substrate 550 of the present embodiment is a glass epoxy substrate and formed with a single substrate by laminating layers. Wiring lines that are formed by a metal film made of copper or the like are formed between a surface of the multilayer substrate 550 on which the LED chips 551 are arranged (front surface), a surface opposing the front surface (rear surface), and the single substrate.

The LED chips 551 include a GaN based semiconductor layer formed therein and generate a blue light component.

However, the color is changed by the fluorescent material applied on the surface of the LED chips 551 so that a white light component is radiated. The LED chips 551 are arranged in lines in the main scanning direction on the multilayer substrate 550, in which the gaps between the chips are uniform.

The light guiding plate 560 is formed of a transparent resin such as acryl, and disposed in the light emitting direction of the LED chips 551 to guide the light from the LED chips 551, as described above. A filter that is not shown in the drawings is provided on a light emitting surface 560a of the light guiding plate 560 from which the light is emitted. On the filter, a convex and concave structure having a predetermined pattern is formed. Therefore, it is possible to emit the light with the predetermined light distribution pattern using the convex and concave structure. The light guiding plate 560 is mounted and fixed by a bracket (not shown) with a predetermined distance from the multilayer substrate 550.

<Description of Control/Image Processing Unit>

Next, descriptions will be made regarding the control/image processing unit 60 shown in FIG. 1.

Figure 3:
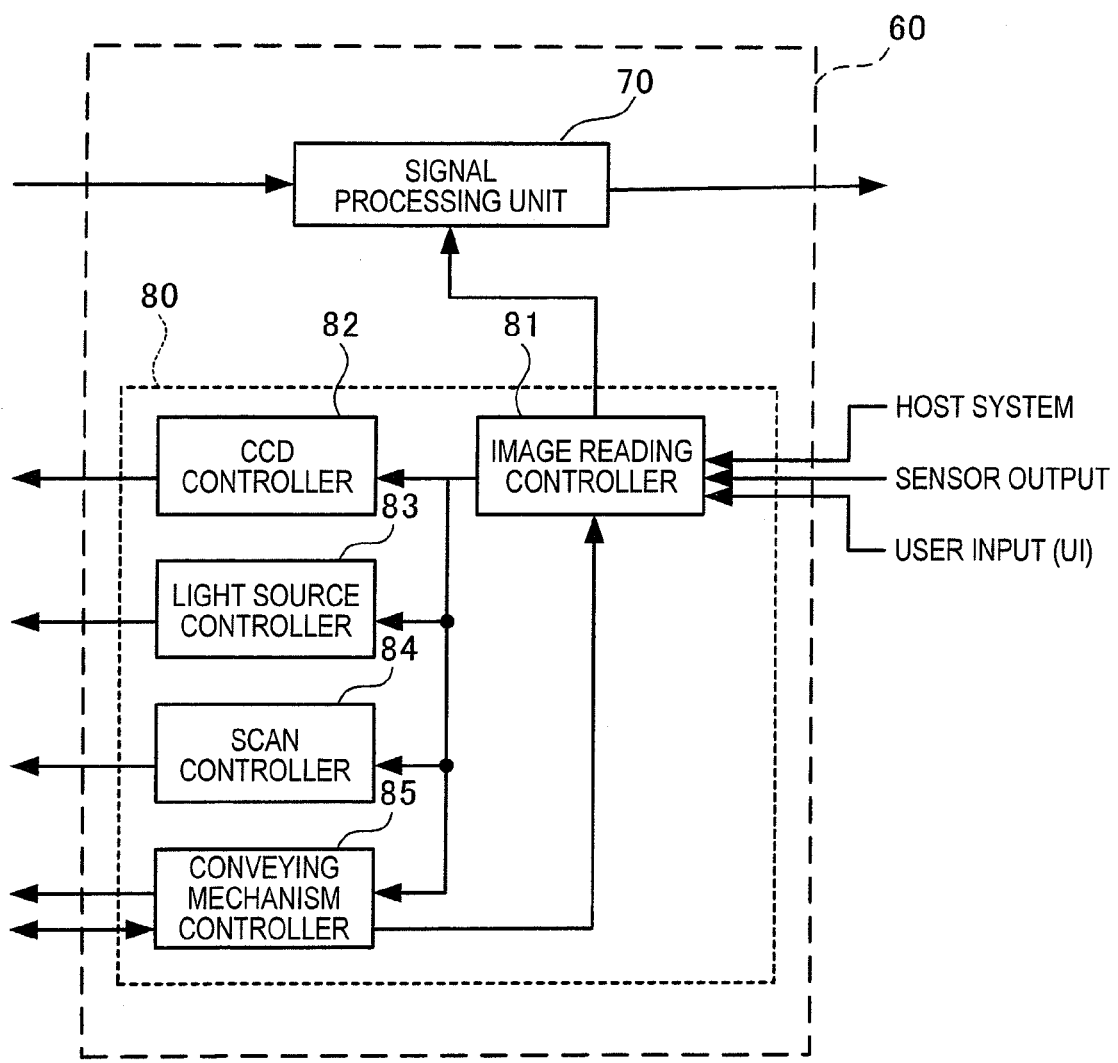
FIG. 3 is a block diagram illustrating a control/image processing unit.

FIG. 3 is a block diagram illustrating a control/image processing unit 60. The control/image processing unit 60 to which the present embodiment is applied includes a signal processing unit 70 that processes image information obtained from the CCD image sensor 59 (see FIG. 1) and a device controller 80 that controls the document feeding device 10 and the reading device 50.

The signal processing unit 70 performs predetermined image processing on the output from the CCD image sensor 59. The output from the signal processing unit 70 is output to a host system such as an image output terminal (IOT) of a printer or a PC.

Figure 4:
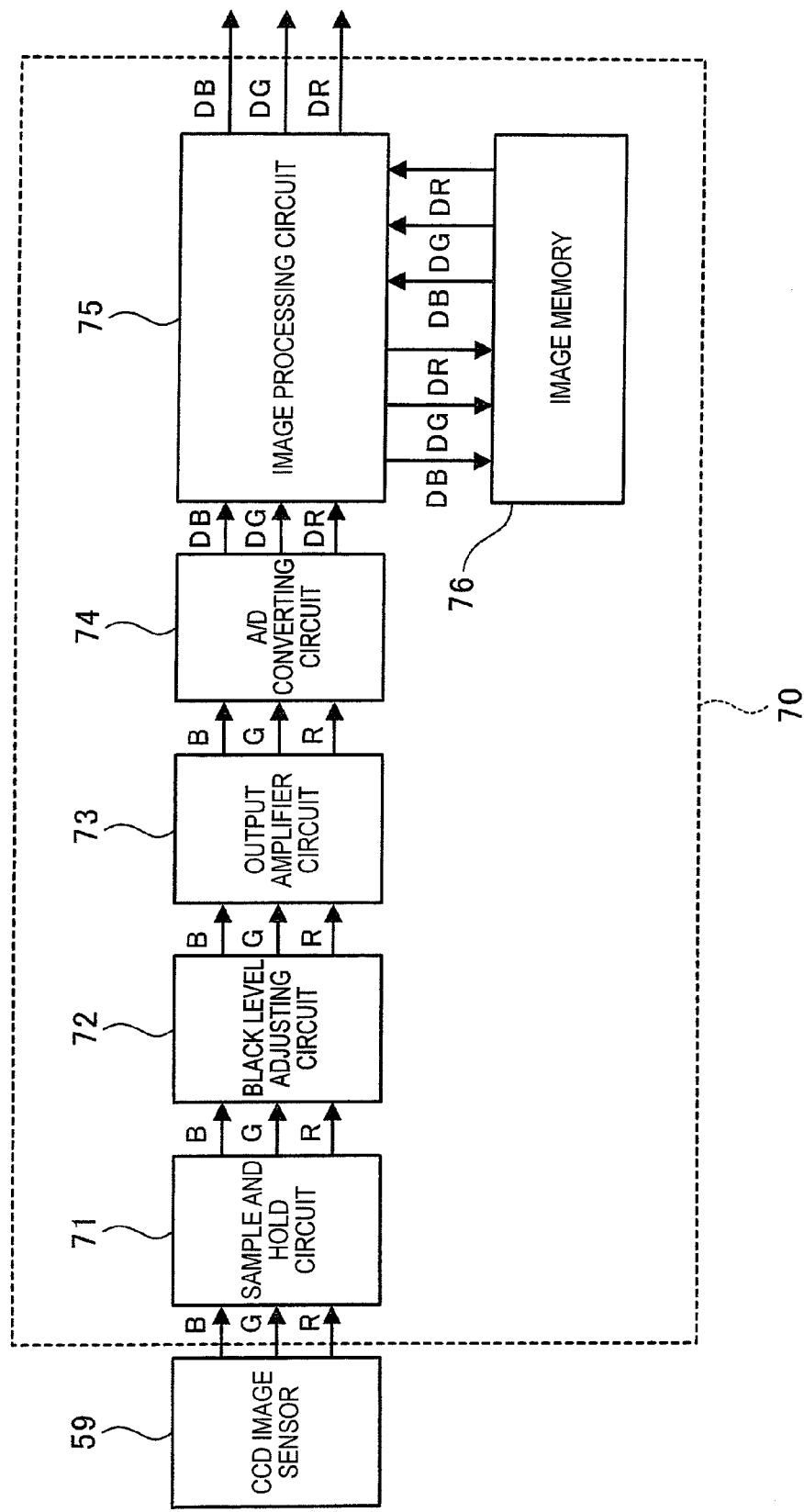
FIG. 4 is a block diagram illustrating a signal processing unit.

FIG. 4 is a block diagram illustrating the signal processing unit 70. The signal processing unit 70 shown in FIG. 4 includes a sample and hold circuit 71, a black level adjusting circuit 72, an output amplifier circuit 73 that is an example of an amplifier means, an A/D converting circuit 74, an image processing circuit (DSP: digital signal processor) 75, and an image memory 76.

The sample and hold circuit 71 receives an RGB signal as analog image data from the CCD image sensor 59, samples the signal, and holds the signal for a predetermined period of time. A black brightness level of the RGB signal is adjusted by the black level adjusting circuit 72, and then the RGB signal is amplified by the output amplifier circuit 73 at a predetermined amplification rate to be a predetermined output level.

Next, the RGB signal which is an analog signal is converted into a digital signal for every pixel of the CCD image sensor 59 by the A/D converting circuit 74 to be DR, DG, and DB signals as digital image data. The digital image data after A/D conversion, for example, is represented using a concentration of 8 bit (256 grayscale), and a minimum concentration of zero (0) is output at a black level, and a maximum concentration of 255 is output at a white level. Therefore, image processing such as shading correction or gamma correction is performed on the DR, DG, and DB signals by the image processing circuit 75 which will be described in detail below and the signals are output.

Returning to FIG. 3, the device controller 80 includes an image reading controller 81 that controls the read out of one side or both sides of the document and totally controls the document feeding device 10 and the reading device 50, a CCD controller 82 that controls the CCD image sensor 59, a light source controller 83 that controls the light source 55 at an appropriate reading timing, a scan controller 84 that controls on/off or the moving speed of the motor in the reading device 50 to control the scanning operation of the full rate carriage 53 and the half rate carriage 54, and a conveying mechanism controller 85 that controls the motor in the document feeding device 10, operation of various rollers, operation of the feeder clutch and switching operation of a gate. Control signals are output from the various controllers to the document feeding device 10 and the reading device 50, and the controllers can control the operations based on the control signals.

The image reading controller 81 sets a reading mode (reading type) based on a control signal from the host system or a sensor output detected, for example, by the automatic selection reading function, or selection by a user through a user interface (UI) and controls the document feeding device 10 and the reading device 50. As the reading mode, a document fixed reading mode that reads the document by loading the document on the first platen glass 52A or a document flowing reading mode such as a single side reading mode using one pass or a reversed both sides reading mode using a reverse pass may be considered. Further, for example, a character image reading mode (character mode) that outputs image data that has been ensured to easily read out the character image by performing a predetermined image processing on the image data that is obtained by reading the document, or a picture image reading mode (picture mode) that outputs image data that has been ensured to easily see a picture image by performing predetermined image processing on the image data obtained by reading the document may be set. And, a black and white reading mode that reads out the document as black and white images or a color reading mode that reads out the document as color images may be set. Further, there are enlargement/reduction modes that enlarge or reduce the image.

<Description of Operation of Image Processing Circuit>

Next, descriptions will be made regarding the operation of the image processing circuit 75 in detail.

FIGS. 5-1 and 5-1 are flow charts illustrating an example of the operation of the image processing circuit 75.

First, the image processing circuit 75 receives the DR, DG, and DB signals as digital image data from the A/D converting circuit 74 (step S101). The image data is stored in the image memory 76 (step S102). Next, the image data is read out from the image memory 76 and shading correction is performed on the image data (step S103). Continuously, gamma correction is performed on the image data (step S104). The background color of the document is detected and then processing of removing the background color is performed (step S105). The image data in which the above image processings are performed is stored in the memory 76 again (step S106).

Next, the image processing circuit 75 determines whether to perform the processing of reducing the image by 50% (step S107) or not. If 50% of reduction is intended for the image ("Yes" at step S107), the image processing circuit 75 reads the image data from the image memory 76 and deletes every other pixel of the image data in the main scanning direction and the sub-scanning direction (step S108). Therefore, it is possible to reduce the image by 50%. After reducing the image by 50%, the image data is stored in the image memory again (step S109).

Next, the image processing circuit 75 determines whether to enlarge/reduce the image in the main scanning direction (step S110). If the image is intended to be enlarged/reduced in the main scanning direction ("Yes" at step S110), the image processing circuit 75 reads out the image data from the image memory 76, and performs a predetermined processing to enlarge/reduce the image in the main scanning direction (step S111). After performing the enlargement/reduction processing in the main scanning direction, the image data is stored in the image memory 76 again (step S112).

The image processing circuit 75 determines whether to enlarge/reduce the image in the sub-scanning direction (step S113). If the image is intended to be enlarged/reduced in the sub-scanning direction ("Yes" at step S113), the image processing unit 75 reads out the image data from the image memory 76 and performs a predetermined processing to enlarge/reduce the image in the sub-scanning direction (step S114). After performing the enlargement/reduction processing in the sub-scanning direction, the image data is stored in the image memory 76 again (step S115).

The image processing circuit 75 reads out the image data from the image memory 76 and performs smoothing/emphasis filter processing (step S116). By performing these processing, random noise included in the image may be removed, minute variation of the concentration for every pixel may be reduced (smoothing), and the change of the concentration value at the edge of the characters may be emphasized (emphasis). After performing these processing, the image data is stored in the image memory again (step S117).

Whether to perform the processing for the above-mentioned 50% reduction of the image, enlargement/reduction of the image in the main scanning direction, enlargement/reduction of the image in the sub-scanning direction or not, is determined, for example, depending on whether the user has specified the processing using the UI. Before performing the enlargement/reduction processing of the image in the main scanning direction and the enlargement/reduction processing of the image in the sub-scanning direction, the 50% reduction is separately performed. This is because the processing of the 50% reduction can be simply performed, and thus, the load in the image processing circuit 75 can be relieved.

According to the present embodiment, the image processing circuit 75 performs the above processings using software. When the enlargement/reduction of the image is performed, as described above, the separate processing is required. Therefore, the load necessary for the processing is increased. As described above, the image data is frequently read out/ stored from/in the image memory 76. However, since the frequent reading out and storing operations make the processing capacity of the image processing circuit 75 to be limited, a large amount of images cannot be processed at one time. This is because, basically, after processing one image, operations that stores the image in the image memory 76, and then reads out the image from the image memory 76 to perform the next image processing are repeated. Therefore, the load in the image processing circuit 75 is increased by the above processes. For this reason, the processing of the image processing circuit 75 cannot satisfy the speed of reading the image. The above disadvantage is more significant at the time of reading the color images. Therefore, in case of reading color images, the amount of image signals is three times more than that of the black-and-white image reading. Therefore, the load in the image processing circuit 75 is also increased as much as the increased amount of image signals.

According to the present embodiment, if the reading mode is the color image reading mode and the enlargement/reduction processing is accompanied, the processing is performed by decreasing the speed of reading the document. More specifically, if the reading mode is the color image reading mode and the enlargement/reduction processing is accompanied, the moving speed of the moving means such as the above-mentioned driving source is decreased to decrease the reading speed of the document in the CCD image sensor 5. In the present embodiment, the scan controller 84 performs the above speed control. Therefore, the scan controller 84 controls the moving speed of the moving means in accordance with the reading mode so as to serves as an example of the moving speed control unit that adjusts the reading speed in the CCD image sensor 59.

When the reading speed of the document in the CCD image sensor 59 is decreased by decreasing the moving speed of the moving means, the charges accumulated in the CCD image sensor 59 are saturated to exceed a saturated output voltage of the CCD image sensor 59. Therefore, by decreasing the reading speed of the document, the photo accumulation period of the CCD image sensor 59 becomes longer, which results in increasing the exposure amount. Therefore, if the reading speed of the document is lower than a predetermined speed, the light that is received by the CCD image sensor 59 becomes larger than the saturated exposure amount so that the charges that are accumulated in the CCD image sensor 59 reaches the saturation amount (saturated charge amount). In this case, it is difficult to normally read out the document.

Therefore, according to the present embodiment, in the above-mentioned case, a turn-OFF period of the light source is set based on the reading mode to control the turn-ON period of the light source so as to prevent the charges accumulated in the CCD image sensor 59 from reaching the saturation amount. That is, the light source controller 83 serves as an example of a turn-ON time control unit.

<Description of Operation of Light Source and CCD Image Sensor>

Figure 6:
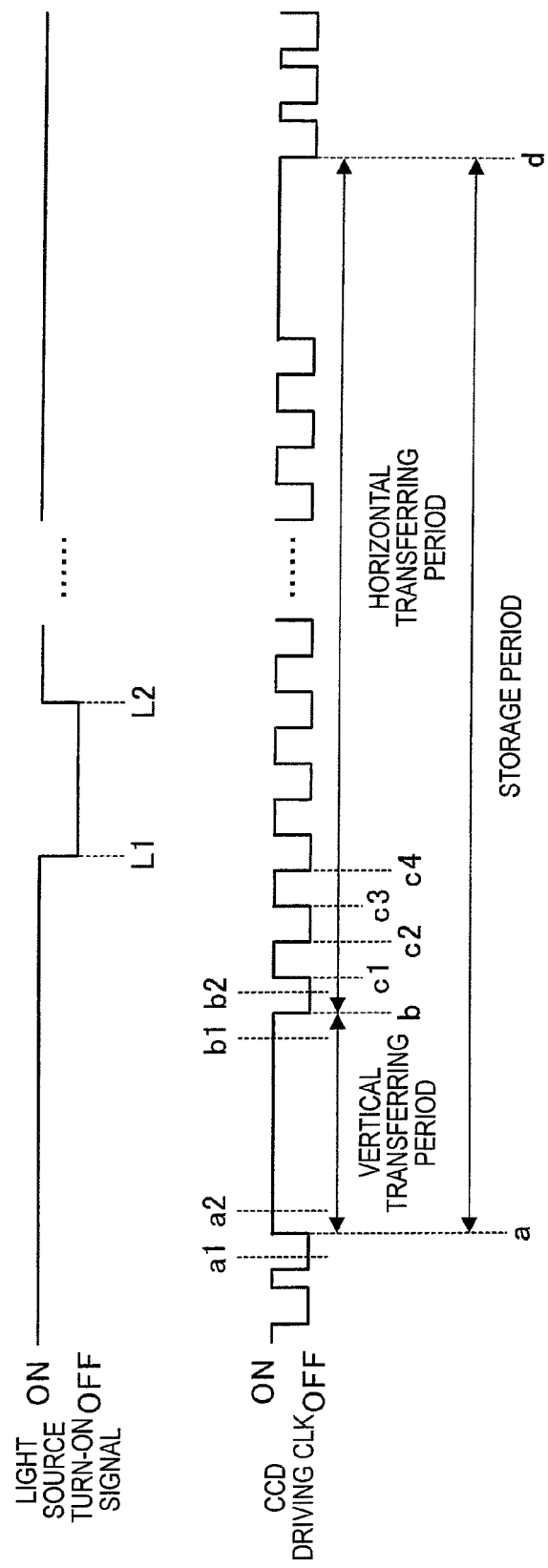
FIG. 6 illustrates a control signal that allows a light source controller to operate the light source and a control signal that allows a CCD controller to operate a CCD image sensor.

FIG. 6 is a view illustrating a control signal that allows a light source controller 83 to operate the light source 55 and a control signal that allows a CCD controller 82 to operate a CCD image sensor 59.

In the drawing, the upper part shows a timing chart of the control signal that allows the light source controller 83 to operate the light source 55. The lower part shows a timing chart of the control signal that allows the CCD controller 82 to operate the CCD image sensor 59.

The timing chart in the lower part is a CCD driving clock CLK. In the present embodiment, the period of time "a" to time "d" refers to a transferring period of image information for one line in the main scanning direction and an accumulating period of the light for one line in the main scanning direction. The transferring period is divided into two periods, that is, a vertical transferring period and a horizontal transferring period.

Figure 7:
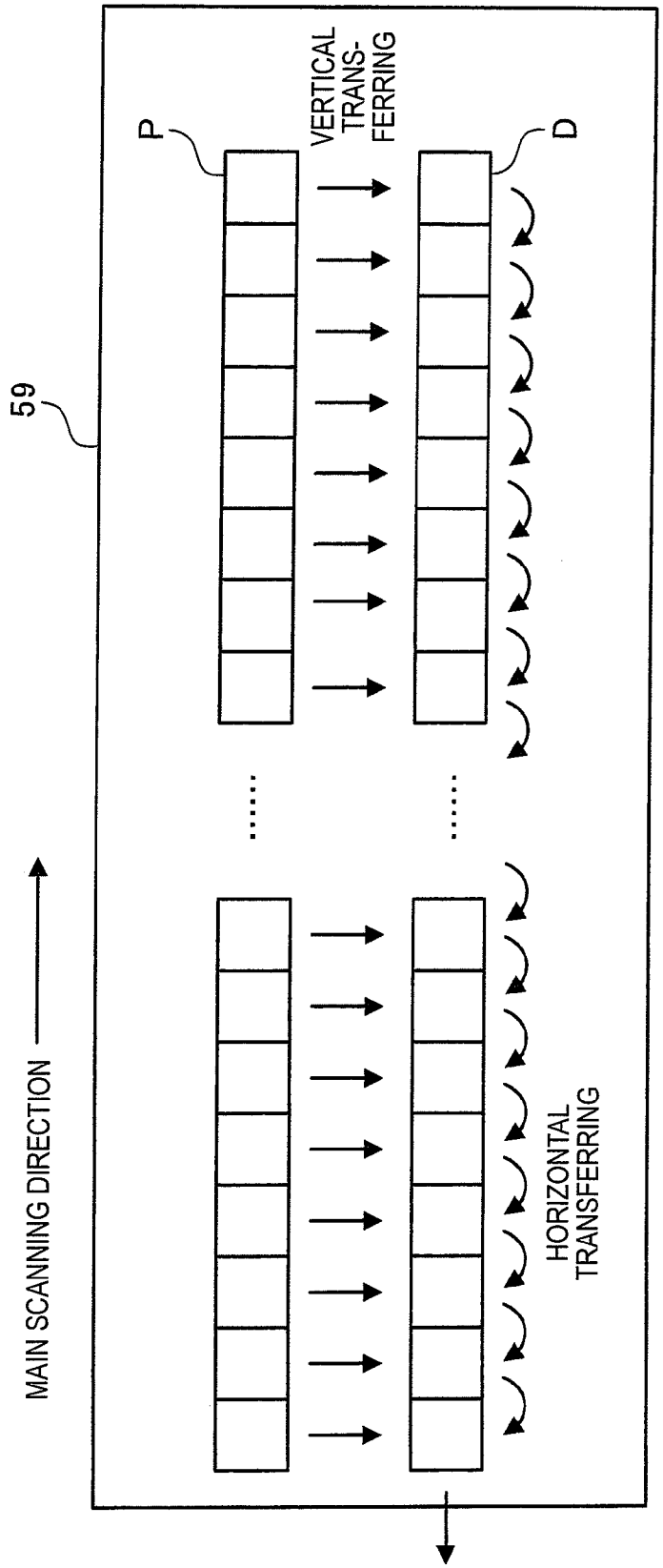
FIG. 7 illustrates an operation of transferring a photoelectric converted charge in a CCD image sensor.

FIG. 7 is a view illustrating an operation of transferring a photoelectric converted charge in a CCD image sensor 59.

In the CCD image sensor 59, photo diodes are arranged in lines on a receiving surface on which the light reflected from the document is received. According to the present embodiment, photo diodes corresponding to R (red), G (green), and B (blue) colors are arranged in three lines so that the image recorded in the document can be read in RGB colors. According to the present embodiment, for example, 7,500 photo diodes are arranged for one line. FIG. 7 shows one line of photo diodes as an example.

The photo diodes P in FIG. 7 are arranged in one line in the main scanning direction, one photo diode P corresponds to one pixel when the image reading apparatus 1 (see FIG. 1) reads out the document. Therefore, if light is irradiated onto the photo diodes P, photoelectric conversion occurs so that charges are accumulated in the photo diodes P. The amount of accumulated charges is proportional to the accumulated time (accumulating period) and the amount of irradiated light. In the photo diodes P, the charges are accumulated for a predetermined storing period and output as an image signal. Generally, the CCD image sensor 59 performs the vertical transmission and the horizontal transmission to output the charges. That is, the charges accumulated in the photo diodes P are vertically transferred and then sent to a charge transferring unit D. The charge transferring unit D is a semiconductor device formed of a CCD (charge coupled device). The charges are horizontally transferred sequentially from the charge transferring unit D so that the charges are output as an image signal for one line.

Returning to FIG. 6, the charges accumulated in the photo diodes P are vertically transferred from the photo diodes P described with reference to FIG. 7 to the charge transferring unit D between the time a and the time b of a vertical transmission period. Then, the first horizontal transmission is performed in the charge transferring unit D between the time "c1" and the time "c2". The second horizontal transmission is performed between the time "c3" and the time "c4". The horizontal transmission is repeated until the charges for one line are completely and horizontally transferred. Charges for the next one line are photoelectrically converted and accumulated in the photo diodes P between the time "a" and the time "d" during which the vertical transmission and the horizontal transmission are performed. Therefore, the charges are vertically and horizontally transferred during the next period, and are output as the image information to the external of the CCD image sensor 59.

According to the present embodiment, a light source turn-ON signal is switched ON to OFF during the charging period of the CCD image sensor 59 as shown in the timing chart of the upper part to set the period during which the light source 55 is turned OFF (period between the time "L1" and the time "L2"). By doing this, the charges accumulated in the CCD image sensor 59 are reduced. Therefore, it is possible to prevent the charges accumulated in the CCD image sensor 59 from reaching the saturated amount.

The turn-OFF period of the light source 55 is set in case where the exposure amount of the CCD image sensor 59 exceeds the saturated exposure amount and the charges accumulated in the CCD image sensor 59 reaches the saturated charge amount, while the light source 55 is continuously turned ON. That is, even though the light source 55 is continuously turned ON, if the exposure amount of the CCD image sensor 59 is below the saturated exposure amount, there is no need to set the turn-OFF period. Therefore, in case that the moving speed of the moving means exceeds the predetermined speed so that the reading speed of the document exceeds the predetermined speed, the exposure amount of the CCD image sensor 58 is below the saturated exposure amount. In this case, since the charges that are accumulated in the CCD image sensor 58 do not reach the saturated charge amount, there is no need to set the turn-OFF period of the light source 55.

Here, the turn-OFF period of the light source 55 is preferably set in the period during which the CCD image sensor 59 horizontally transfers the charges. The light source 55, as described above, for example, uses light that is emitted by an LED. However, before and after turning ON and OFF the LED, the color tint changes easily. Therefore, when the turn-OFF period of the light source 55 is set in the period during which the CCD image sensor 59 vertically transfers the charges, the document may not be normally read out due to the influence of the color change of the LED.

As the same reason, within a predetermined time that includes the starting time (time a) and the ending time (time b) of the period during which the charge is vertically transferred by the CCD image sensor 59, it is preferable that the light source is not turned ON and OFF. The predetermined time is illustrated in FIG. 6 where the time "a" is inserted between the time "a1" and the time "a2" and the time "b" is inserted between the time "b1" and time "b2". Therefore, the time period of the time "a1" to "a2" and the time "b1" to time "b2" is a time during which the color tint of the light source 55 is easily varied and the turn-OFF time of the light source 55 is preferably set to avoid the above period.

According to the present embodiment, if the charges that are accumulated in the CCD image sensor 59 do not reach the saturated charge amount while the light source 55 is continuously turned ON, the amplification factor of the output amplifier circuit 73 (see FIG. 4) is changed based on the reading speed.

Figure 8:
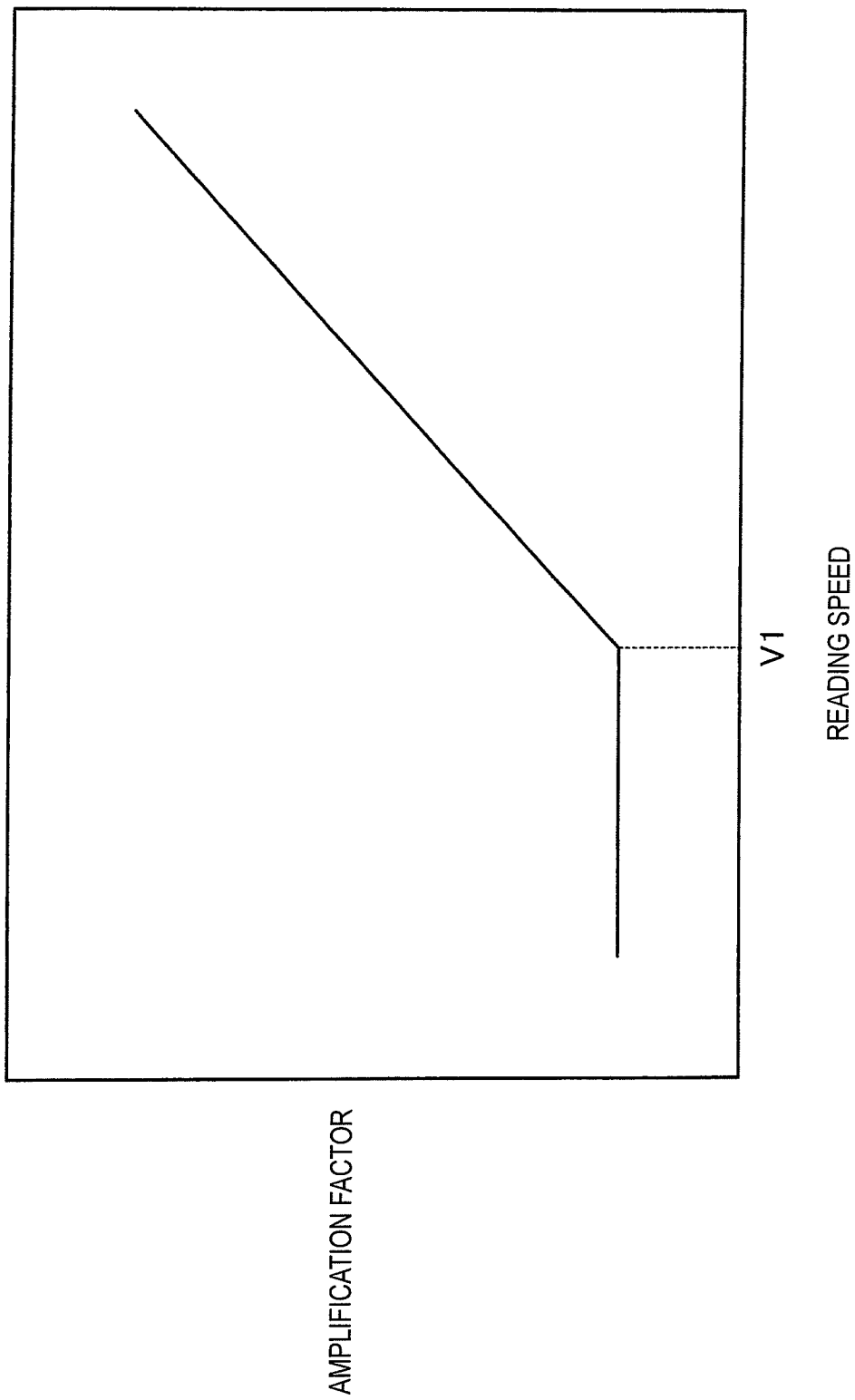
FIG. 8 is a conceptual diagram illustrating a relationship between a reading speed of a CCD image sensor and an amplification factor in an output amplifier circuit.

FIG. 8 is a conceptual diagram illustrating a relationship between a reading speed of a CCD image sensor 59 and an amplification factor in an output amplifier circuit 73. In FIG. 8, the horizontal axis indicates the reading speed and the vertical axis indicates the amplification factor of the output amplifier circuit 73.

In FIG. 8, if the reading speed is below V1, the charges that are accumulated in the CCD image sensor 59 reaches the saturated charge amount while the light source 55 is continuously turned ON. In the speed area where the reading speed exceeds V1, the amplification factor of the output amplifier circuit 73 is increased. In other words, in the speed area where the reading speed exceeds V1, if the light storage period of the CCD image sensor 59 is short, the amplification factor of the output amplifier circuit 73 is increased and if the light storage period of the CCD image sensor 59 is long, the amplification factor of the output amplifier circuit 73 is decreased. By doing this, the output level from the output amplifier circuit 73 is substantially constant. Accordingly, it becomes difficult to depend on the light storage period of the CCD image sensor 59. If the light storage period of the CCD image sensor 59 is long, more light can be photoelectrically converted to be image information. Therefore, it is possible to obtain better S/N ratio (signal to noise ratio).

Figure 9A:
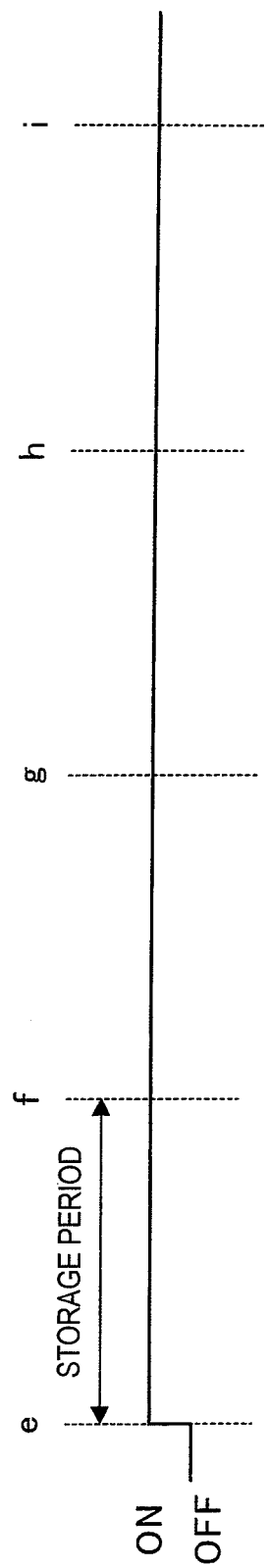
Figure 9B:
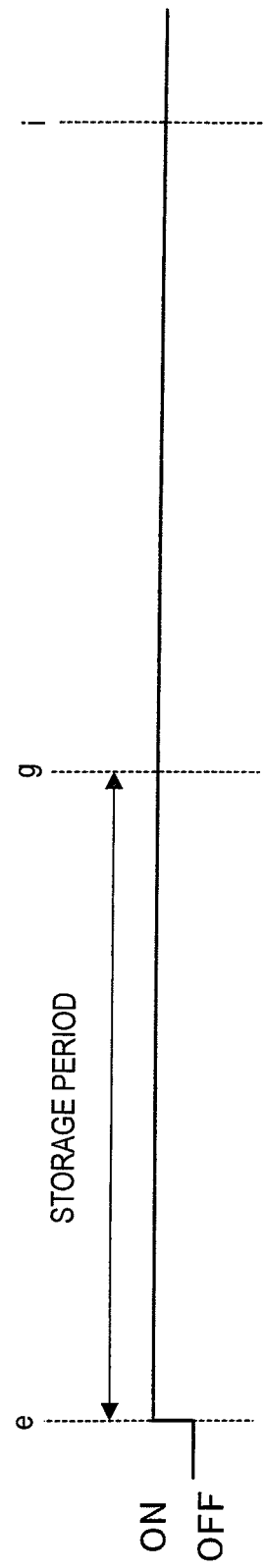

FIGS. 9A to C show timing charts of a light source turn-on signal when a reading mode is changed.

FIG. 9A shows a timing chart of a light source turn-ON signal when the enlargement/reduction processing is not performed at the time of reading black and white images. FIG. 9B shows a timing chart of a light source turn-ON signal when the enlargement/reduction processing is performed at the time of reading black and white images. FIG. 9C shows a timing chart of a light source turn-ON signal when the enlargement/reduction processing is not performed at the time of reading color images.

As shown in FIG. 9A, the reading time for one line by the CCD image sensor 59 is the period between the time "e" and the time "f". The time is specifically, for example, 300 □s. That is, the light storage period of the CCD image sensor 59 corresponds to the period between the time "e" and the time "f". During the storage period, since the charges that are accumulated in the CCD image sensor 59 do not reach the saturated charge amount, the light source turn-ON signal remains ON state, the light source 55 is not turned OFF and maintains the turned-ON state.

As shown in FIG. 9B, the reading time for one line is twice as much as that of FIG. 9A, and corresponds to the period between the time "e" and the time "g". Therefore, the light storage period of the CCD image sensor 59 corresponds to the period between the time "e" and the time "g". Even though the storage period is twice the storage period of FIG. 9A, since the charges that are accumulated in the CCD image sensor 59 do not reach the saturated charge amount, the light source turn-ON signal is ON, and the light source 55 is not turned OFF and maintains the turned-ON state. However, since the intensity of the image signal output from the CCD image sensor 59 becomes twice, as compared with the case where the turn-OFF period of the light source is set, the output level from the output amplifier circuit 73 is allowed to become almost the same as that of FIG. 9A by making the amplification factor of the output amplifier circuit 73 (see FIG. 4) to be half of the amplification factor of FIG. 9A. By doing this, the S/N ratio of the image to be read becomes better than that of FIG. 9A.

As shown in FIG. 9C, the reading time for one line is four times as much as that of FIG. 9A, and corresponds to the period between the time "e" and the time "i". Therefore, the light storage period of the CCD image sensor 59 is the period between the time "e" and the time "i". The storage period is four times the storage period of FIG. 9A. According to the present embodiment, while the light source 55 is turned ON, the charges that are accumulated in the CCD image sensor 59 reaches the saturated charge amount. Therefore, the light source turn-ON signal is switched from ON to OFF between the time "g" and the time "i" to set the turn-OFF period of the light source. In this case, the intensity of the image signal output from the CCD image sensor 59 is almost the same as the intensity in FIG. 9B. Therefore, the amplification factor of the output amplifier circuit 93 becomes the same as that of FIG. 9B and the output level from the output amplifier circuit 73 is almost the same as those of FIGS. 9A and 9B.

<Description of Overall Operation of Device Controller>

Next, descriptions will be made regarding the overall operation of the device controller 80 including the control of the light source 55 and the CCD image sensor 59.

Figure 10:
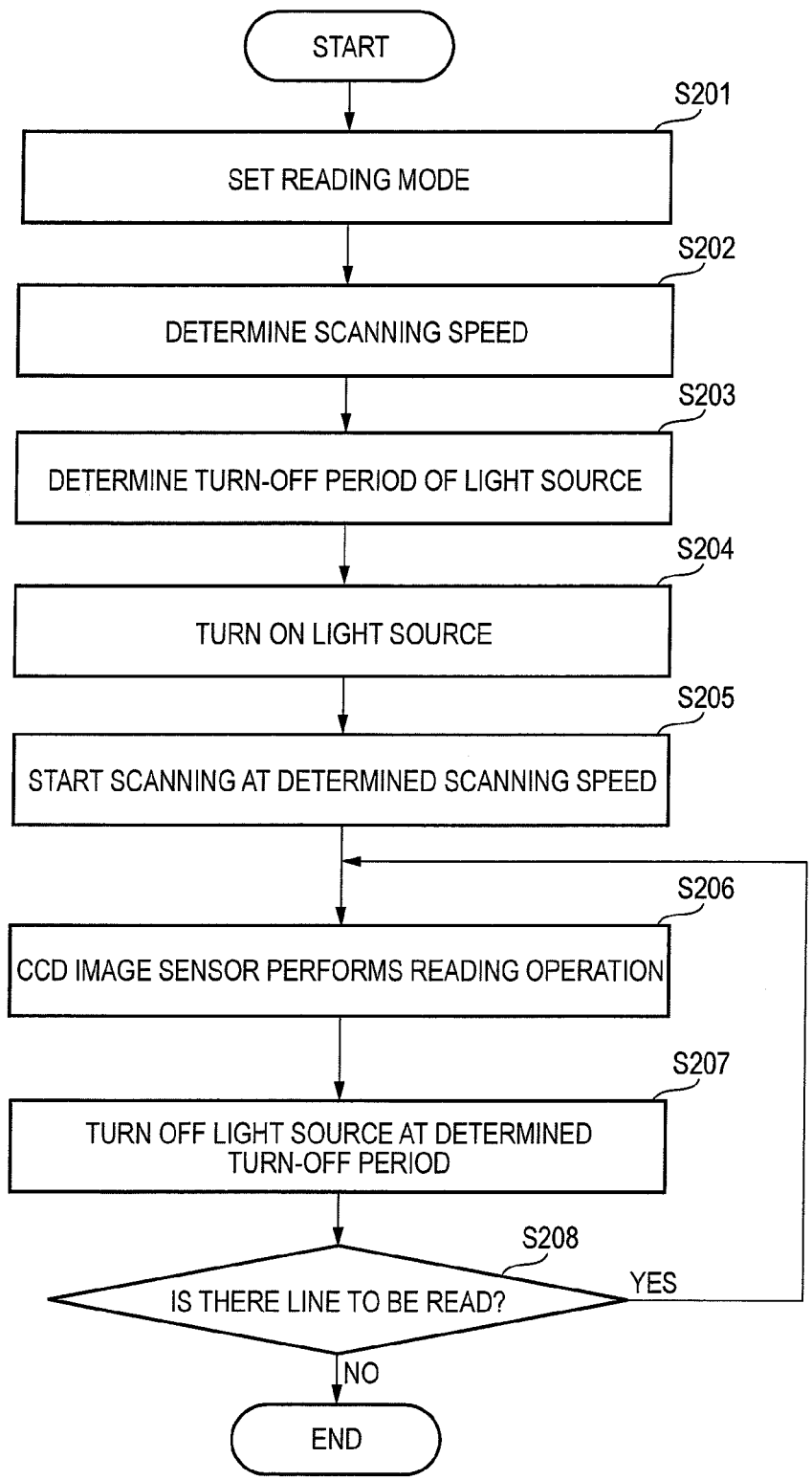
FIG. 10 is a flow chart illustrating an exemplary operation of a device controller.

FIG. 10 is a flow chart illustrating an example of an operation of the device controller 80.

First, the image reading controller 81 sets the reading mode based on the sensor output and the selection of a user using the UI (step S201). Based on the set reading mode, the image reading controller 81 determines the moving speed (scanning speed) of the moving means (step S202).

The image reading controller 81 determines the turn-OFF period of the light source 55 (step S203). The turn-OFF period may be determined based on any of the reading mode and the scanning speed. As described above, depending on the reading mode, the turn-OFF period may not be set.

The light source controller 83 turns ON the light source 55 by switching the light source turn-ON signal from OFF to ON (step S204). The scan controller 84 starts the scanning at a scanning speed determined at step S202 (step S205).

Next, the CCD image sensor 59 reads out a first line at a predetermined timing (step S206). The reading operation is performed by vertically and horizontally transferring the photoelectrically converted charges by the CCD image sensor 59 according to the CCD driving clocks output from the CCD controller 82 as shown in FIGS. 6 and 7.

During the period of the horizontal transmission, the light source controller 83 switches the light source turn-ON signal from ON to OFF during the turn-OFF period determined by the image reading controller 81 to turn OFF the light source 55 (step S207). If the reading operation for the first line is completed, the image reading controller 81 determines whether lines to be read remains (step S208). If there is no more lines to be read ("No" at step S208), the reading operation of the document is completed. If there are lines to be read ("Yes" at step S208), the processing returns to step 206, the reading operation for the next line is performed.

The device controller 80 performs the above-mentioned control so that even though the reading speed is changed, it is possible to prevent the charges that are accumulated in the CCD image sensor 59 from reaching the saturated charge amount. Therefore, even though the reading speed is changed, it becomes difficult for the images to be read to change.

According to the present embodiment described above, the processings performed by the signal processing unit 70 or the device controller 80 may be implemented by cooperation of software and hardware resources. That is, a CPU (not shown) in a control computer provided in the image reading apparatus 1 executes programs so as to implement the functions of the signal processing unit 70 or the device controller 80 provided in the image reading apparatus 1 and implements the functions of the components.

The processings performed by the device controller 80 described with reference to FIG. 10 allows a computer to perform a turn-ON control function that controls the light source 55 to be turned ON to irradiate light onto the document, a reading unit control function that controls the CCD image sensor 59 that receives the reflected light from the document and photoelectrically converts the received light to accumulate the charges as the image signal, and a moving speed control function that controls the moving speed of the moving means that relatively moves the light source 55 and the document according to the reading mode. The turn-ON control function can be implemented by a program that controls the turn-ON time of the light source 55 by setting the period during which the light source 55 is turned OFF based on the reading mode in the period during which the CCD image sensor 59 accumulates the charges so that the charges accumulated in the CCD image sensor 55 do not reach the saturated charge amount.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a light source that irradiates light onto a document;
   a reading unit that receives light reflected from the document, converts the received light into electrical charges, and accumulates the electrical charges as an image signal;
   a moving unit that relatively moves the light source and the document;
   a moving speed control unit that controls a moving speed of the moving unit in accordance with a reading mode of the image reading apparatus to control a reading speed in the reading unit; and
   a turn-ON time control unit that controls the light source to be turned off in a given period based on the reading mode when the reading unit accumulates the electric charges so as to prevent the electrical charges accumulated in the reading unit from reaching a saturation amount,
   wherein the reading unit includes a semiconductor device that vertically and horizontally transfers the electrical charges accumulated by a charge coupled device to read out the electrical charges as the image signal, and
   the turn-ON time control unit sets the given period in which the light source is controlled to be turned off such that the given period begins after a beginning of a period during which the electrical charges are horizontally transferred and ends before an end of the period during which the electrical charges are horizontally transferred.

2. The image reading apparatus according to claim 1 further comprising an amplifier unit that amplifies the image signal at a given amplification factor,
wherein, in a case where the charge accumulated in the reading unit do not reach the saturation amount while the light source is continuously turned ON, the amplifier unit changes the amplification factor based on the reading speed.

3. The image reading apparatus according to claim 1, wherein the reading unit includes a semiconductor device that vertically and horizontally transfers the electrical charges accumulated by a charge coupled device to read out the electrical charges as the image signal, and
the turn-ON time control unit does not change an ON/OFF state of the light source within a predetermined time in which a starting time and an ending time of the period during which the charges are vertically transferred are included.

4. A non-transitory computer readable medium storing a program causing a computer to perform a process for reading an image, the process comprising:
controlling a light source that irradiates light onto a document;
controlling a reading unit that receives light reflected from the document, converts the received light into electrical charges, and accumulates the electrical charges as an image signal; and
controlling a moving speed control unit that controls a moving speed of a moving unit that relatively moves the light source and the document in accordance with a reading mode of the image reading apparatus to control a reading speed in the reading unit,
wherein, in the controlling the light source, the light source is controlled to be turned off in a given period based on the reading mode when the reading unit accumulates the electric charges so as to prevent the electrical charges accumulated in the reading unit from reaching a saturation amount,
in the controlling the reading unit, the reading unit that is controlled includes a semiconductor device that vertically and horizontally transfers the electrical charges accumulated by a charge coupled device to read out the electrical charges as the image signal, and
in the controlling the light source, the given period in which the light source is controlled to be turned off is set such that the given period begins after a beginning of a period during which the electrical charges are horizontally transferred and ends before an end of the period during which the electrical charges are horizontally transferred.

5. The non-transitory computer readable medium according to claim 4, wherein the process further comprising:
controlling an amplifier unit that amplifies the image signal at a given amplification factor,
wherein, in a case where the charge accumulated in the reading unit do not reach the saturation amount while the light source is continuously turned ON, the amplifier unit changes the amplification factor based on the reading speed.

6. The non-transitory computer readable medium according to claim 4, wherein in the controlling the reading unit, the reading unit that is controlled includes a semiconductor device that vertically and horizontally transfers the electrical charges accumulated by a charge coupled device to read out the electrical charges as the image signal, and
in the controlling the light source, an ON/OFF state of the light source is not changed within a predetermined time in which a starting time and an ending time of the period during which the charges are vertically transferred are included.

7. A method of reading an image, the method comprising:
controlling a light source that irradiates light onto a document;
controlling a reading unit that receives light reflected from the document, converts the received light into electrical charges, and accumulates the electrical charges as an image signal; and
controlling a moving speed control unit that controls a moving speed of a moving unit that relatively moves the light source and the document in accordance with a reading mode of the image reading apparatus to control a reading speed in the reading unit,
wherein, in the controlling the light source, the light source is controlled to be turned off in a given period based on the reading mode when the reading unit accumulates the electric charges so as to prevent the electrical charges accumulated in the reading unit from reaching a saturation amount,
in the controlling the reading unit, the reading unit that is controlled includes a semiconductor device that vertically and horizontally transfers the electrical charges accumulated by a charge coupled device to read out the electrical charges as the image signal, and
in the controlling the light source, the given period in which the light source is controlled to be turned off is set such that the given period begins after a beginning of a period during which the electrical charges are horizontally transferred and ends before an end of the period during which the electrical charges are horizontally transferred.

8. The method according to claim 7, further comprising:
controlling an amplifier unit that amplifies the image signal at a given amplification factor,
wherein, in a case where the charge accumulated in the reading unit do not reach the saturation amount while the light source is continuously turned ON, the amplifier unit changes the amplification factor based on the reading speed.

9. The method according to claim 7, wherein in the controlling the reading unit, the reading unit that is controlled includes a semiconductor device that vertically and horizontally transfers the electrical charges accumulated by a charge coupled device to read out the electrical charges as the image signal, and
in the controlling the light source, an ON/OFF state of the light source is not changed within a predetermined time in which a starting time and an ending time of the period during which the charges are vertically transferred are included.

* * * * *